(12) United States Patent
Dietrich

(10) Patent No.: US 12,154,137 B2
(45) Date of Patent: Nov. 26, 2024

(54) SALES SUPPORT SYSTEM

(71) Applicant: MCon Group AG, St. Gallen (CH)

(72) Inventor: Christian Dietrich, Wiesbaden (DE)

(73) Assignee: MCon Group AG, St. Gallen (CH)

( * ) Notice: Subject to any disclaimer, the term of this patent is extended or adjusted under 35 U.S.C. 154(b) by 19 days.

(21) Appl. No.: 17/275,691

(22) PCT Filed: Sep. 16, 2019

(86) PCT No.: PCT/EP2019/074616
§ 371 (c)(1),
(2) Date: Mar. 12, 2021

(87) PCT Pub. No.: WO2020/053441
PCT Pub. Date: Mar. 19, 2020

(65) Prior Publication Data
US 2022/0027952 A1    Jan. 27, 2022

(30) Foreign Application Priority Data

Sep. 14, 2018   (LU) ........................................ 100930

(51) Int. Cl.
*G06Q 30/02*   (2023.01)
*G06F 3/01*    (2006.01)
(Continued)

(52) U.S. Cl.
CPC ..... *G06Q 30/0269* (2013.01); *G06Q 30/0261* (2013.01); *G06Q 30/0267* (2013.01);
(Continued)

(58) Field of Classification Search
CPC .. G06Q 50/188; G06Q 30/02; G06Q 30/0645; G06Q 20/3278; H04L 63/0853; H04M 3/42221
See application file for complete search history.

(56) References Cited

U.S. PATENT DOCUMENTS 9,002,536 B2 *  4/2015  Hatton ................ H04L 63/0853
                                                              701/2
2003/0065532 A1 *  4/2003  Takaoka ............... G06Q 50/188
                                                              705/26.1
(Continued)

FOREIGN PATENT DOCUMENTS

| CN | 104199544 A | 12/2014 |
| TW | 201421394 A | 6/2014 |
| WO | 2006006753 A1 | 1/2006 |

*Primary Examiner* — Saba Dagnew
(74) *Attorney, Agent, or Firm* — Hodgson Russ LLP

(57) ABSTRACT

A sales support system for selling vehicles and/or vehicle accessories is disclosed. The sales support system has a computer-aided control system designed and equipped to receive customer-related customer information, and to determine and transmit customized customer-specific product information. The sales support system also has a showroom including at least one detection device and at least one output device. The detection device acquires at least one item of information about a customer who enters or is in the showroom, automatically and without any particular action by the customer, and passes the information to the control system. The control system determines at least one item of customized customer-specific product information from the acquired customer information, and passes the information to the output device. The output device outputs the information such that the customer can immediately perceive the product information that is intended for the customer.

22 Claims, 8 Drawing Sheets

(51) Int. Cl.
    *G06Q 30/0251*    (2023.01)
    *H04W 4/02*    (2018.01)
    *H04W 4/021*    (2018.01)
    *H04W 4/029*    (2018.01)
    *G06V 40/16*    (2022.01)

(52) U.S. Cl.
    CPC ........... *H04W 4/021* (2013.01); *H04W 4/029* (2018.02); *G06F 3/013* (2013.01); *G06V 40/174* (2022.01)

(56) References Cited

U.S. PATENT DOCUMENTS

| | | | | |
|---|---|---|---|---|
| 2003/0088436 | A1* | 5/2003 | Berger | G06Q 30/02 |
| | | | | 705/305 |
| 2003/0154114 | A1* | 8/2003 | Lucarelli | G06Q 30/02 |
| | | | | 340/8.1 |
| 2006/0074769 | A1 | 4/2006 | Looney et al. | |
| 2006/0195483 | A1* | 8/2006 | Heider | B60R 16/037 |
| 2008/0228577 | A1 | 9/2008 | Decre et al. | |
| 2008/0257957 | A1* | 10/2008 | Steinecker | G06Q 30/02 |
| | | | | 340/286.01 |
| 2012/0246027 | A1* | 9/2012 | Martin | G02B 27/0172 |
| | | | | 705/26.63 |
| 2012/0259715 | A1* | 10/2012 | Robson | G06Q 20/20 |
| | | | | 705/16 |
| 2012/0265616 | A1 | 10/2012 | Cao et al. | |
| 2014/0278910 | A1 | 9/2014 | Visintainer et al. | |
| 2015/0025936 | A1 | 1/2015 | Garel et al. | |
| 2016/0042423 | A1* | 2/2016 | Henry | G06Q 30/0645 |
| | | | | 705/26.61 |
| 2016/0069699 | A1 | 3/2016 | Chen et al. | |
| 2016/0125491 | A1 | 5/2016 | Zellner et al. | |

\* cited by examiner

SALES SUPPORT SYSTEM

CROSS-REFERENCE TO RELATED APPLICATIONS

The present application is the U.S. national phase of International Application No. PCT/EP2019/074616 filed Sep. 16, 2019, which claims the benefit of and priority to Luxembourgian Patent Application No. 100930 filed Sep. 14, 2018, the entire disclosure of which is incorporated herein by reference.

FIELD

The present disclosure relates to a sales support system, in particular for supporting the sale of vehicles and/or vehicle accessories.

BACKGROUND

Currently, every customer who enters the showroom of a dealer, especially a car dealer, is presented with the same offer. It is therefore always up to the dealer to initiate a conversation to find out what the customer is interested in. The dealer can make specific proposals to the customer only after determining this. In general, a dealer initially knows nothing about the interests, preferences, and buying desires of a customer who enters a showroom.

From US2016125491, it is known to monitor a customer in a showroom, whereby shopping parameters of the customer are generated, and it is determined whether the customer would like to buy a product in the showroom according to the shopping parameters.

SUMMARY

It is therefore the object of the present disclosure to specify a sales support system that makes it possible to provide customer-specific offers to a customer in a showroom.

This object is achieved by means of a sales support system, which is characterized in that
a. the sales support system comprises a computer-aided control system that is designed and equipped to receive customer-related customer information, and to determine and transmit customer-specific product information therefrom in a customized manner, and in that
b. the sales support system comprises at least one showroom that includes at least one detection device and at least one output device, wherein
c. the detection device acquires at least one item of information about a customer who enters the showroom or is in the showroom, automatically and in particular without any particular action on the part of the customer, and passes said information to the computer-aided control system, and wherein
d. the control system determines at least one item of customer-specific product information from the acquired customer information in a customized manner, and passes said information so the output device, and wherein
e. the output device receives the customer-specific product information from the control system and outputs said information in such a way that the customer can perceive the product information intended for said customer, in particular immediately and directly.

The present disclosure has the very particular advantage that product information tailored to the customer's interests, preferences, and purchasing desires can be provided automatically and directly to the customer in a showroom via at least one output device. For this purpose, the sales support system acquires at least one item of customer information (preferably several items of customer information) automatically and preferably without any particular action on the part of the respective customer, said information being associated with customer-specific product information by a control system. The acquisition of the at least one item of customer information (preferably several items of customer information) preferably takes place in such a way that the customer does not notice it and in particular is not disturbed by it.

One way of obtaining an item of customer information is, for example, to read out a mobile electronic device of the customer, in particular wirelessly (for example, via WLAN or RFID or NFC). The electronic device may, for example, be a mobile telephone, in particular a smartphone, of the customer, and/or the car key of the customer, which contains a data memory containing vehicle-specific data.

It is particularly advantageous, for example, possible, in particular wirelessly and/or unnoticed, to read out the customer's car key, which, in the case of many manufacturers, contains a memory chip and a transponder. In most cases, a unique identifier is stored on the key (key ID). In addition, the VIN (vehicle identification number) of the customer's vehicle is stored on the key. Reading out the key ID and/or the VIN, preferably unnoticed by the customer, makes it possible to obtain an item of customer information in an advantageous manner. By means of a database query, the key ID and/or the VIN can be used to retrieve the name and/or the residential or business address of the customer, making it possible to associate this additional customer information with the customer. Alternatively or in addition to determining the customer's name and/or address, it is particularly advantageous to determine whether the same customer has previously entered the showroom, for example, within the last several days, (holding the same car key), or has appeared on an interactive kiosk system of the sales support system or on a mobile presentation platform of the sales support system, and customer information has been acquired in the process. In this respect, unlike in the case of a service process, in which the customer hands over the car key to a service employee so that said employee can read out status data about the vehicle and/or the vehicle's units that are stored on the car key, the objective here is to use the car key preferably unnoticed and/or wirelessly as an identifier with respect to the customer.

As mentioned above, by reading the car key, it is possible to obtain the VIN (vehicle identification number) of the customer's vehicle. From the VIN, it is possible, by means of a database query that is carried out preferably immediately and directly, to find out, for example, when the customer's current vehicle was built and what equipment it has. From this customer information, it is possible to draw further conclusions about possible offers to the customer. For example, it is possible to provide the customer with offers for accessories for said customer's car by means of the output device (preferably by means of several output devices), if the vehicle was purchased recently and, for example, is only six months old. On the other hand, it is possible, for example, to make an offer to the customer to trade a vehicle if the car is older, for example, more than one year old. In this case, product information about a new vehicle may be provided to the customer in a customized and customer-specific manner via the output device (preferably by means of several output devices), wherein the control system takes into consideration which vehicle type and which equipment the customer most likely prefers, based on the customer's current vehicle.

It is not absolutely necessary to acquire the exact identity (in particular the name and address) of the customer. Rather, in most cases, other customer information is sufficient to provide the respective customer with the product information that is likely to be relevant.

One way of acquiring customer information is to detect the customer's face via a camera and using facial recognition software. In particular, via computer-aided facial recognition, at least the age, the gender, and so forth, can be determined. Here, for the purpose described above, it is sufficient if metadata are determined. In particular, the image does not necessarily have to be stored. However, it is also possible and useful to recognize a customer (including with respect to the customer's identity). This is, for example, so that the control system can take customer information into consideration that relates to this customer and is already available, for example, with respect to previous dealer or service visits and the reason for them, or with respect to the previous frequency of new car purchases, or with respect to the condition of the current vehicle that is serviced by the same dealer, when determining the product information.

All in all, the purpose of acquiring the customer information is to determine, with the greatest possible accuracy, what the customer entering the showroom is highly interested in. The more customer information and the more precisely customer information can be obtained for this purpose, the more accurately the computer-aided control system can determine customer-specific product information.

For this purpose, the control system can preferably also draw in particular on previously collected statistical data. For example, it has been statistically proven that women prefer different engine types than men, and that young people prefer different equipment than older people. In this respect, an association of possible customer information or possible combinations of customer information with product information can advantageously be stored in a memory area of the control system. It is possible to draw on this association in each case when determining the customer-specific product information, in particular automatically and/or by means of a software-based determination model of the control system, taking into consideration the customer information actually acquired in each case.

More generally, it may be advantageously provided that the detection device reads an item of customer information out of an electronic device that the customer is carrying, in particular automatically and/or wirelessly. Preferably, confidential or personal data are not collected. However, for example, using the unique identifier of the mobile telephone or using data of the car key, it is possible to find out whether the same customer has previously already visited the showroom, for example, several days ago, in order to be able to associate what the customer was interested in at the time of said customer's last visit as customer information. Alternatively or in addition, it is also possible to form an association as to whether the customer has previously already visited another showroom that is also equipped with a detection device, or whether the customer has appeared in another manner, for example, at an interactive kiosk system of the sales support system or at a mobile presentation platform of the sales support system, and customer information was thereby acquired that can be associated with the customer.

The present disclosure makes it possible to personalize the customer's experience in the showroom. An additional example: If it has been determined from the customer information, in particular automatically, that the customer has a three-year-old vehicle of a particular type, said customer probably wants a new vehicle of the same type or of a similar type or being similarly equipped. In this case, the display screens toward which the customer moves in the salesroom automatically display offers for a new vehicle in the matching color and having the equipment that the customer is likely to prefer.

As mentioned above, the electronic device may, for example, be a car key that contains a data memory and that can preferably be read wirelessly. Car keys of this type are already widespread on the market, wherein in most cases, vehicle data, for example, the basic data about a vehicle with respect to type and equipment, and data about wear conditions or data about service work that has been performed or is to be performed, are stored in the data memory. All these data can be read out and used as customer information in order to determine at least one item of customer-specific product information by means of the computer-aided control system.

Alternatively or in addition, it may advantageously also be provided that the detection device and/or an additional detection device reads out a mobile telephone, in particular a smartphone, that the customer is carrying, or a car key that the customer is carrying. For example, the detection device may read out the information with respect to a vehicle configuration that the customer has already made and, for example, may have made via the Internet, and has stored in said customer's mobile telephone, and use said information as customer information in order to determine at least one item of customer-specific product information by means of the computer-aided control system.

Preferably, the detection device comprises a radio receiver and/or a radio transmitter. In particular, it may be advantageously provided that the detection device comprises a radio receiver and/or a radio transmitter that operates on the basis of RFID or NFC or WLAN or Bluetooth. In this way, it is made possible for the detection device to be able to communicate unidirectionally or bidirectionally with all electronic devices that customers generally carry with them.

In a very particularly advantageous embodiment, the detection device continuously detects where the customer is located in the showroom. In particular if several different exhibits are on display in the showroom, and/or different information is being provided on several display screens about one or several products, in particular vehicles, vehicle parts, or accessory parts, it is possible in this manner to determine what is apparently interesting to the customer, and what is not. For example, customers will not spend time at exhibits that are not interesting to them, or stop in front of display screens that display things that are not interesting to them. However, as will be described below in greater detail, it is in particular possible for the control system to exchange screen display content that is not interesting to the customer for other screen display content that includes at least one identified item of customer-specific product information, in particular automatically, on the basis of the acquired customer information.

Alternatively or in addition, it may also advantageously be provided that the detection device determines whether the customer is moving inside the showroom. For example, a salesperson may be notified if the customer stops for an extended period of time in front of an exhibit, for example, a vehicle, wherein the determined customer-specific product information is simultaneously displayed to the salesperson, for example, on a tablet PC. The salesperson is thereby able to address the customer's wishes very specifically and to make corresponding offers.

Alternatively or in addition, it may also be provided that the detection device detects the route that the customer takes inside the showroom. For example, it is thus possible to determine the exhibits, in particular vehicles, and/or the display screens or showcases toward which the customer moves. From the knowledge about the relevant exhibits, display screen content, and showcase contents, the control system can obtain, in particular automatically, at least one item of customer information about what the customer is highly interested in.

Alternatively or in addition, it may also be advantageously provided that the detection device detects the output device toward which the customer is moving, and/or detects the output device in front of which the customer is located. From the knowledge about what the output device is currently outputting, the control system can obtain, in particular automatically, at least one item of customer information about what the customer is highly interested in. Furthermore, alternatively or in addition, by detecting the output device toward which the customer is moving, and/or by detecting the output device in front of which the customer is located, it is possible for the control system, for example, to transmit an item of product information determined specifically for the customer, directly to the relevant output device, and thus to inform the customer immediately and in real time, in a customer-specific manner.

In a very particularly advantageous embodiment, it is provided that the detection device and/or an additional detection device determines, by means of triangulation, in particular by measuring directions, travel times, distances, and/or angles, continuously or at specified time intervals, where a readable device that the customer is carrying is located inside the showroom. The device may particularly advantageously be in particular a car key or a mobile telephone, in particular a smartphone. In this manner, the sales support system can determine whether the customer is moving inside the showroom, and/or the route that the customer has taken inside the showroom, and/or the exhibits toward which the customer is moving, and/or the output device toward which the customer is moving, and/or the output device in front of which the customer is located.

In particular, it may advantageously be provided that, on the one hand, the detection device determines the location of the electronic device inside the showroom in particular by means of triangulation, as well as the time that the electronic device remains at the respective determined location in each case. In this manner, it is possible to determine the exhibits, showcases, or display screen in front of which the customer spends a longer time. In this manner, it is possible to infer what the customer is interested in and is not interested in. Preferably, the sales support system associates these informational data, and/or determines the customer-specific product information, taking this information into consideration, in particular automatically.

Alternatively or in addition, it is also possible for the detection device to detect the customer's current viewing direction. From the knowledge about the exhibits or the display screen content that the customer looks at, it is possible to infer customer information as to what the customer is highly interested in. In particular, it may advantageously be provided that the detection device comprises a pupil monitoring system, wherein the pupil monitoring system determines which sections of the content displayed on the display screen are being viewed by the customer, in particular by tracking the pupil movement of the customer's eyes, as an additional item of customer information. From the knowledge about the display screen content of the sections of a display screen, the control system can obtain, in particular automatically, at least one item of customer information about what the customer is highly interested in.

In a very particularly advantageous embodiment, the detection device detects, in particular continuously or continually at specific time intervals, an externally detectable state of mind of the customer. The state of mind may be detected, for example, by recognizing a facial expression and/or by analyzing sounds emitted by the customer. For this purpose, the detection device may advantageously comprise a camera and/or a microphone.

The detection of a state of mind may, for example, be performed by capturing the customer's face by means of a camera of the detection device, and comparing combinations of distinctive facial features with stored reference combinations in a comparison module of the detection device, wherein a specific type of facial expression is associated with each reference combination. If the customer has a satisfied facial expression when viewing a section of the content displayed on the display screen, the detection device or control system will determine that customer apparently likes the displayed content, and will take this into consideration when determining the at least one item of customer-specific product information.

On the other hand, if the customer frowns when viewing the content displayed on a display screen or when viewing an exhibit, the detection device or control system will determine that the customer apparently does not like the displayed content, and will accordingly take this into consideration when determining the at least one item of customer-specific product information.

Similarly, the detection device may detect whether the customer makes one or more sounds, for example, when viewing a display screen or an exhibit, and may possibly evaluate said sounds, in particular by means of speech recognition software. If, for example, a customer says "great" when viewing a display screen or an exhibit, the detection device or the control system will determine that the customer apparently likes the displayed content, and will take this into consideration when determining the at least one item of customer-specific product information.

More generally, alternatively or in addition, it may also be provided that the face of the customer, which was captured by means of a camera of the detection device, is analyzed, in particular automatically and/or by means of software, in order to determine the gender and/or the age of the customer. Here, it may, for example, be provided that particular detected facial features and/or particular detected combinations of facial features are compared with stored reference features and/or stored combinations of reference features, wherein the previously stored reference features or stored combinations of reference features are respectively associated with a gender or an age. This may, for example, take place in the detection device, which then transmits the age and/or the gender of the respective customer to the control system as customer information.

In a very particularly advantageous embodiment, the control system associates the acquired customer information with the relevant customer in each case, and stores the association in a memory. If new customer information is added, it is also associated with the customer and stored. The stored associations and customer information are associated with customer-specific product information, in particular in a determination module of the control system. Preferably, these associations are also stored in a customer-specific manner.

In a particular embodiment, at least one camera is present, which acts as a detection device. In particular, advantageously, several cameras may also be present, in order, for example, to be able to detect the movement behavior of several customers simultaneously and precisely, and/or to be able to detect where the customer spends time in the showroom in a three-dimensional manner.

In a very particularly advantageous embodiment of the sales support system, several identical detection devices are present and/or several detection devices of different types are present. In particular, a sales support system is particularly advantageous in which at least a first detection device is present for reading out the car key, a second detection device is present for reading out the mobile telephone, and a third detection device is present in the form of a camera. The first detection device and the second detection device may advantageously be arranged directly in the entry area of the showroom, in order to be able to read out the customers' electronic devices immediately upon entering.

As mentioned above, the output device may, for example, be configured as a display screen. It is also possible that the output device or an additional output device is configured as a touchscreen. In a particular embodiment, the output device is configured as a tablet PC. In particular, it is advantageously possible and preferred that several identical output devices are present and/or that several output devices of different types are present.

In particular in the case of an output device that is configured as a display screen, a detection device may advantageously be present that detects and transmits to the control system which sections of the content displayed on the display screen are being viewed by the customer, in particular by tracking the pupil movement of the customer's eyes. From the knowledge about the display screen content of the sections of a display screen, the control system can obtain, in particular automatically, at least one item of customer information about what the customer is highly interested in.

In a particular embodiment, the output device is configured as an interactive price tag that outputs an item of price information as product information. The interactive price tag may, for example, comprise a display screen in order to display price information, in particular including a price list with respect to accessories and/or equipment variants. For example, it may be provided that the interactive price tag displays a customer-specific item of price information that, for example, includes customer-specific discounts, precisely for the respective customer standing in front of it.

In particular, and according to an independent idea of the disclosure, the interactive price tag may also be configured in such a way that it independently detects which exhibit is in the vicinity, and bases the price that is relevant to this exhibit on this information. Alternatively, it may also be provided that the control system controls the interactive price tag accordingly.

In a very particularly advantageous embodiment, the sales support system comprises at least one additional detection device that is not arranged in the showroom, and that is designed and configured to acquire an item of customer information about a customer, and to pass it to the computer-aided control system. In particular, it may advantageously be provided that for determining the at least one item of product information, the control system also takes into consideration at least one additional item of customer information that was acquired by means of the additional detection device before the customer entered the showroom.

The additional detection device may be installed, for example, in the departure hall of an airport, or in a restaurant, or in a sports club such as a golf club.

For example, such an additional detection device may be configured as part of an interactive kiosk system. A kiosk system in this sense is in particular an interactive computer that is installed at a fixed location, in particular in a public space, for example, in a train station concourse, or in an airport terminal, or in a restaurant, or in a sports club. Said computer provides the users with information and preferably also provides the opportunity to make inputs, for example, via a touchscreen or a keyboard, or via gesture control, and/or via a pointing device. The kiosk system's additional detection device passes these inputs to the control system as additional customer information.

In a particularly advantageous embodiment, the kiosk system comprises a display screen and a pupil monitoring system, wherein the pupil monitoring system determines which sections of the content displayed on the display screen are being viewed by the customer, in particular by tracking the pupil movement of the customer's eyes, as an additional item of customer information. From the knowledge about the display screen content of the viewed sections of a display screen, the control system can obtain, in particular automatically, at least one item of customer information about what the customer is interested in.

If the customer enters the showroom at a later time, this customer information (acquired via the external additional detection device) is available for determining the customer-specific product information that is output to the customer in the showroom. For this purpose, it is necessary for the control system to recognize, on the basis of the acquired customer information, that there is at least a high probability that it is the same customer. For this purpose, the additional detection device, which is, for example, configured as an interactive kiosk system, may, for example, read out data of the customer's car key, and pass it to the control system as customer information, so that the control system can immediately associate the customer information of this customer, if, at a later time, having the same car key, the customer enters the showroom, where the car key data will be read out again by a detection device of the showroom.

In a particularly advantageous embodiment, the additional detection device is part of a mobile presentation platform that provides a display area for at least one product. The mobile presentation platform may, for example, comprise one or several display areas for vehicles. In addition, the mobile presentation platform may be equipped with one or several detection devices, in exactly the same manner as the showroom. By means of its detection device or its detection devices, the mobile presentation platform acquires at least one item of customer information about a customer who enters the mobile presentation platform or who approaches the mobile presentation platform, automatically and in particular without particular action on the part of the customer, and passes said information to the computer-aided control system. Similarly to how it is described above with respect to a kiosk system, this item of customer information is available at a later time if the customer enters the showroom to determine customer-specific product information.

The additional detection device can advantageously act and/or be configured exactly like the detection device described above. In particular, several additional detection devices may also be present. In particular, it may be advantageously provided that the additional detection device reads out a mobile telephone, in particular a smartphone that the customer is carrying, or a car key that the customer is carrying. In a very particularly advantageous embodiment, the additional detection device continuously detects where the customer is located relative to a kiosk system to which the additional detection device belongs, or where the customer is located within a mobile presentation platform. In particular, on the one hand, it may advantageously be provided that the additional detection device (or several additional detection devices) determines the location of the electronic device, in particular by means of triangulation, as well as a time that the electronic device remains at the respective determined location in each case. In this manner, it is possible to determine the exhibits, showcases, or display screen in front of which the customer spends a longer time. In this manner, it is possible to infer what the customer is interested in and is not interested in. Preferably, the sales support system matches these items of informational data, and/or determines the customer-specific product information, taking this information into consideration, in particular automatically.

Alternatively or in addition, the control system can advantageously be designed and configured to receive at least one additional item of customer information via the Internet, in particular from a PC of the customer. For example, in such an embodiment, the control system may receive a product configuration entered by means of a configuration program that is provided on a website and via which in particular a vehicle including equipment is configurable, and use it as customer information to determine customer-specific product information.

In particular in order to be able to associate such customer information with a customer with a high hit probability, it is advantageous if an item of information about the CPU and/or the graphics card and/or the monitor and/or the GPS receiver and/or the IP address and/or the location and/or the MAC address and/or the operating system and/or the browser type and/or the time zone and/or installed fonts and/or cookies of the customer's PC and/or of the customer's electronic device, in particular of the customer's smartphone, are acquired as additional customer information.

In a very particularly advantageous embodiment, the showroom includes a WLAN router that is part of a detection device, wherein (preferably free) access to the Internet is offered to the customer via this WLAN router. By using this access, at least some of the aforementioned information with respect to the customer's PC and/or the customer's electronic device, in particular the customer's smartphone, may be acquired and compared with previously acquired customer information, in particular in order to increase the hit probability with respect to the recognition of a customer. In this respect, it may advantageously be provided that the control system comprises a comparison module, in particular a software-based comparison module, that triggers and performs the aforementioned comparison, in particular automatically.

As soon as a customer has been identified in the showroom who has previously made entries in an anonymous session on the Internet, for example on the dealer's website, that have been stored as customer information, the control system can respond and output customer-specific product information to this customer in the showroom via at least one output device. When determining the customer-specific product information, the data entered into a configurator of the dealer's website has preferably also been taken into consideration. As mentioned above, the output device may, for example, be a display screen or also a tablet PC of a salesperson present in the showroom.

Alternatively or in addition, the control system may also be designed and configured to receive at least one additional item of customer information in the form of a product configuration that was created by means of a configuration app, and to use it as customer information.

The customer information or the additional customer information that is acquired by means of the detection device or by means of the several and/or additional detection devices, may, for example, relate to the VIN (vehicle identification number) of the customer's vehicle.

Alternatively or in addition, it may advantageously be provided that the customer information and/or the additional customer information relates to the customer's gender.

In particular, it is also possible that the customer information and/or the additional customer information relate to external recognition features, in particular facial features and/or a gait pattern, of the customer.

Alternatively or in addition, it is also possible that the customer information and/or the additional customer information relate to the customer's name and/or address.

As mentioned above, the customer information and/or the additional customer information may also relate to vehicle-specific data, in particular with respect to customer's current vehicle. In particular, the customer information and/or the additional customer information may relate to the vehicle type and/or the vehicle's age and/or the vehicle equipment and/or the driving behavior and/or the vehicle condition of the customer's vehicle.

As mentioned above, the customer information and/or the additional customer information may include which sections of the content displayed on a display screen have been viewed by the customer, because the control system obtains an item of customer information about what the customer is interested in, in particular automatically, from the knowledge about the display screen content of the viewed sections of a display screen.

As mentioned above, it is advantageous to acquire as much different customer information about a customer as possible, so that the control system can determine at least one item of customer-specific product information in each case with the greatest possible hit probability.

BRIEF DESCRIPTION OF THE DRAWING VIEWS

The drawing schematically depicts the object of the present disclosure by way of example, and describes it below with the aid of the figures, wherein identical or identically acting elements are provided with the same reference signs in most cases, even in different exemplary embodiments. The following are shown:

DETAILED DESCRIPTION

Figure 1:
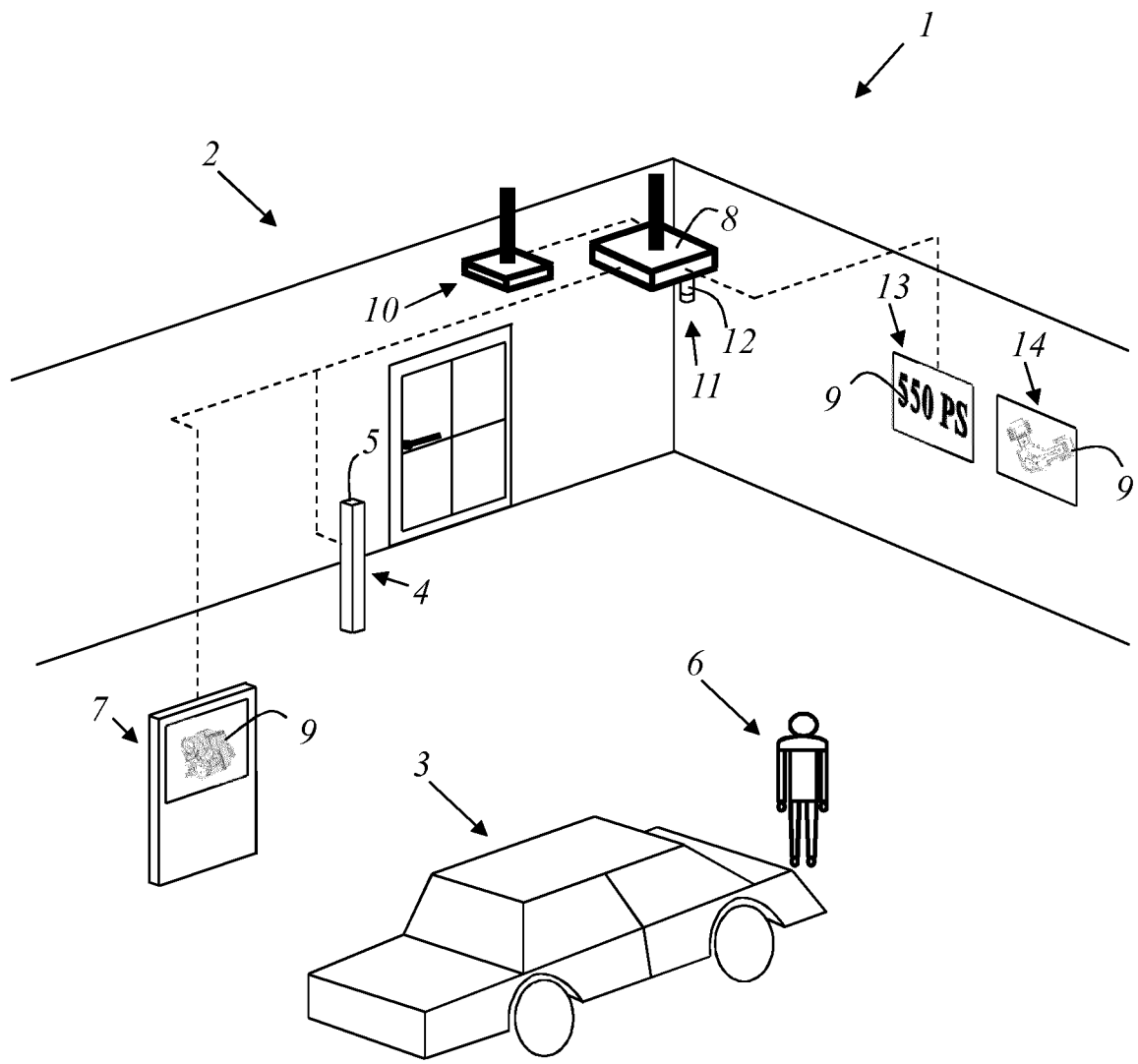
FIGS. 1 to 3 depict an exemplary embodiment of a sales support system according to the present disclosure.

FIG. 1 depicts an exemplary embodiment of a sales support system 1 according to the present disclosure. The sales support system 1 comprises a showroom 2, inter alia, for vehicles 3, and in this exemplary embodiment, is configured to support the sale of vehicles 3 and vehicle accessories.

The showroom 2 comprises a first detection device 4, which is configured as a reader 5 based on the RFID standard or the NFC standard, for reading a customer's car key 6.

The first detection device 4 is arranged in the entry area and acquires an item of customer information about the customer 6 who enters the showroom 2, in particularly automatically and in particular without any particular action on the part of the customer 6. The first detection device 4 passes the customer information to the computer-aided control system 8. Specifically, the first detection device 4 is designed and configured to read a mobile electronic device, in particular the car key, of the user 6, which comprises a data memory containing vehicle-specific data. The first detection device 4 is connected to a control system 8 that is designed and configured to receive customer information relating to customers 6, and to determine and to transmit customer-specific product information 9 therefrom in a customized manner.

In addition, the sales support system 1 comprises a second detection device 10 that is designed and configured to read out a mobile telephone, in particular a smartphone, of the customer 6. The second detection device 10 is also connected to the control system 8.

In addition, the sales support system 1 comprises a third detection device 11. The third detection device 11 is configured as a camera 12 and is attached to the control system 8. The third detection device 11 is also connected to the control system 8. By means of the camera 12, in particular the movement behavior of the customer 6 inside the showroom 2 is detected and routed to the control system 8 in the form of an item of customer information.

In addition, the showroom 2 comprises a first output device 7 that is configured as a display screen. The first output device 7 is connected to the control system 8 and receives customer-specific product information 9 from the control system. The control system 8 determines at least one item of customer-specific product information 9 from the acquired customer information in a customized manner, and passes said information to the first output device 7.

Figure 2:
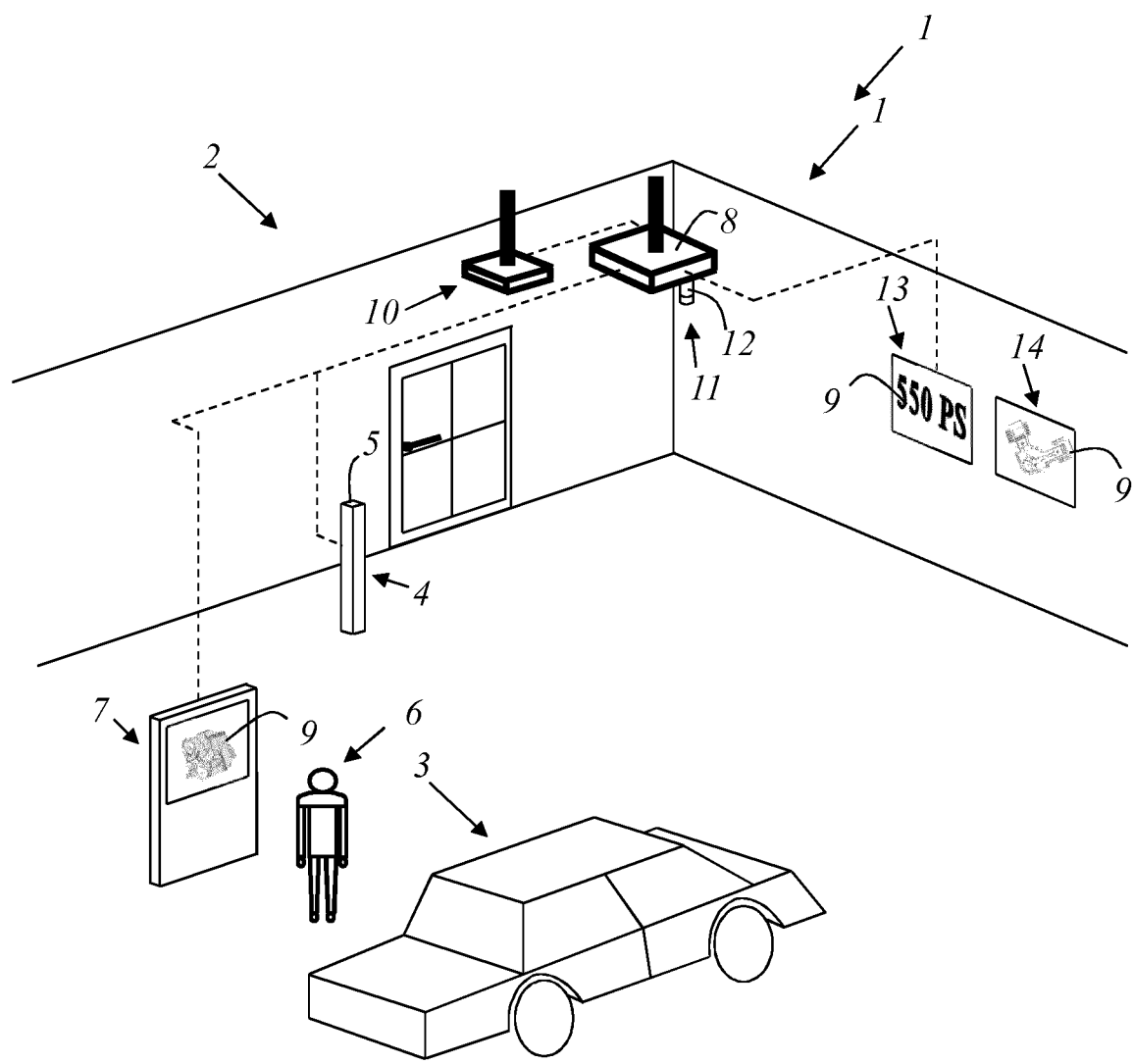

The output device 7 receives the customer-specific product information from the control system 8 and outputs it in such a way that the customer 6 can immediately perceive the product information 9 that is intended for said customer. This preferably takes place if it has been determined by means of the third detection device 11 that the customer 6 is moving toward the first output device 7, as depicted in FIG. 2.

In addition, the sales support system 1 comprises a second output device 13 and a third output device 14, both of which are also configured as display screens on which product information 9 is output. The second output device 13 and the third output device 14 are also connected to the control system 8 and receive customer-specific product information 9 from the control system 8.

Figure 3:
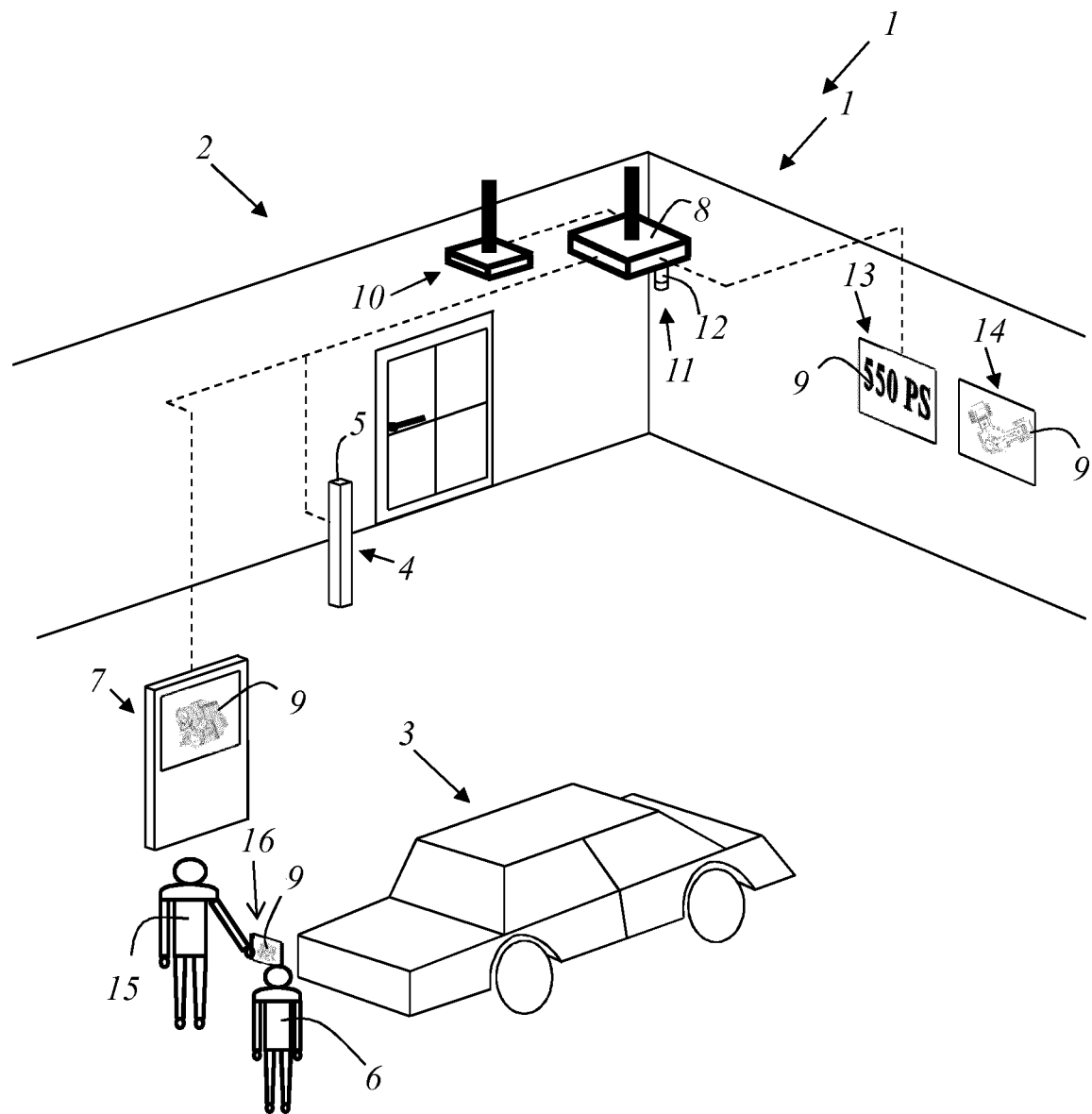

The third detection device 11, in particular the camera 12, also detects in particular whether the customer 6 is moving inside the showroom 2. A salesperson 15 is notified by the computer-based control system 8 if the customer 6 remains standing in front of an exhibit, for example, a vehicle 3, for a longer period of time, wherein the determined customer-specific product information 9 is simultaneously displayed to the salesperson 15, for example, on a tablet PC 16. The salesperson 15 is thereby able to address the customer 6 very specifically with respect to said customer's wishes, and to make corresponding offers, as depicted in FIG. 3.

Figure 4:
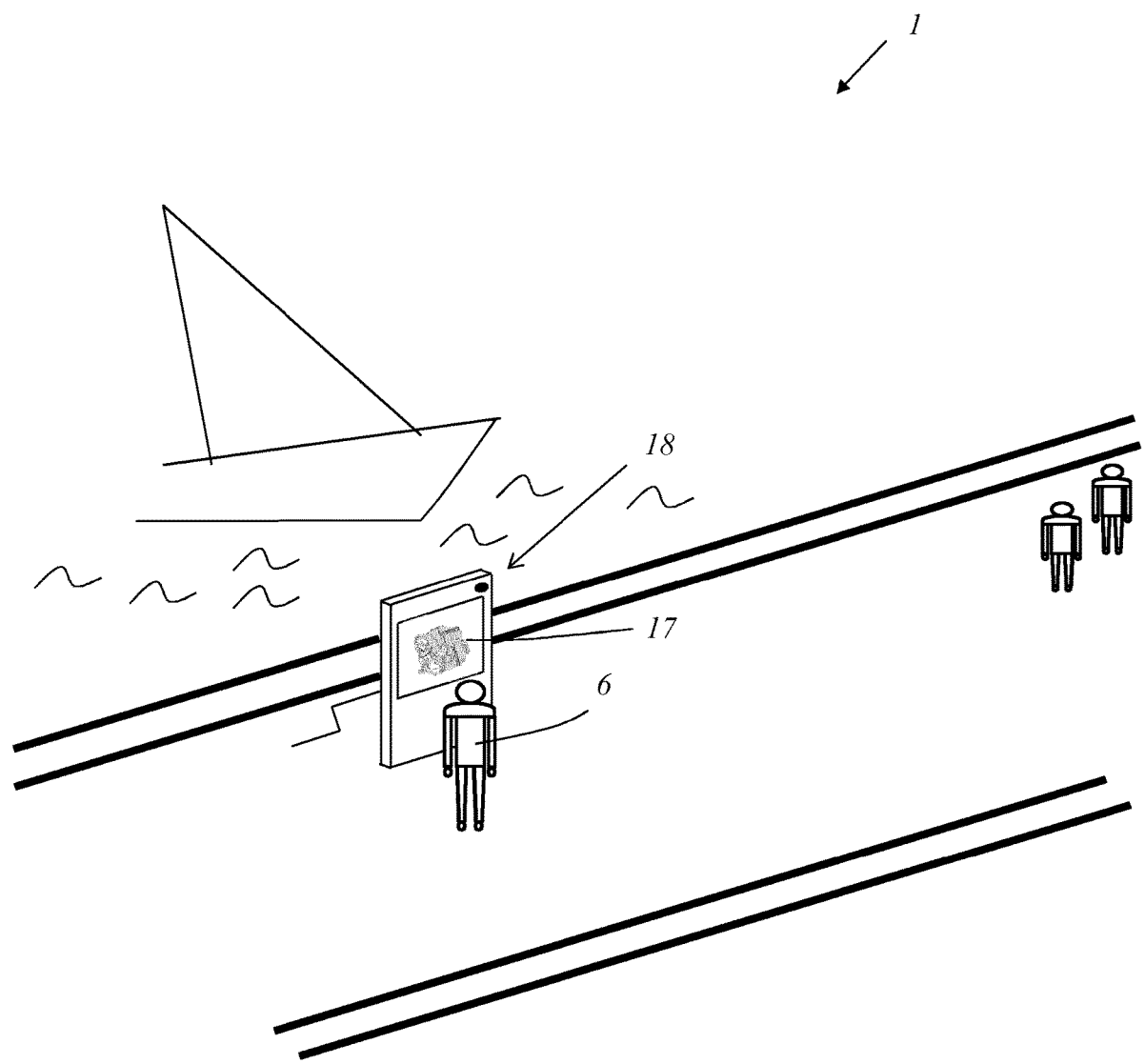
FIG. 4 depicts an exemplary embodiment of an additional detection device in the form of a kiosk system of a sales support system according to the present disclosure.

FIG. 4 depicts an exemplary embodiment of an additional detection device 17 of a sales support system 1 according to the present disclosure, wherein the additional detection device 17 is configured as part of a kiosk system 18.

The customer information that the customer previously left at the additional detection device 17 before entering the showroom 2 are also associated with the customer information that is acquired for a customer in the showroom. In the example, the additional detection device 17 is installed in a yacht club in the form of a kiosk system 18.

The additional detection device 17 is also connected, preferably wirelessly, to the control system 8, and passes acquired customer information to the control system 8.

Figure 5:
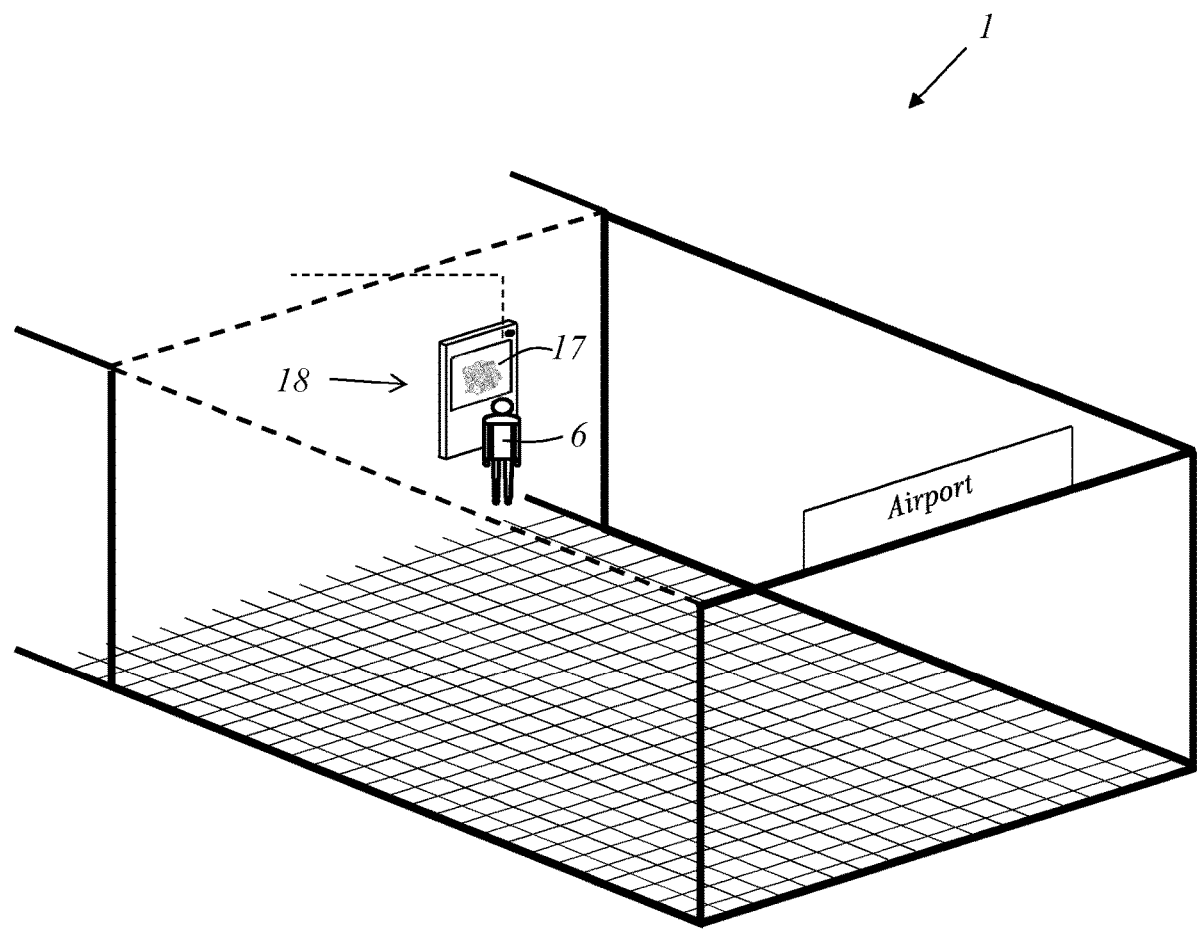
FIG. 5 depicts an exemplary embodiment of an additional detection device in the form of a kiosk system of a sales support system according to the present disclosure.
Figure 6:
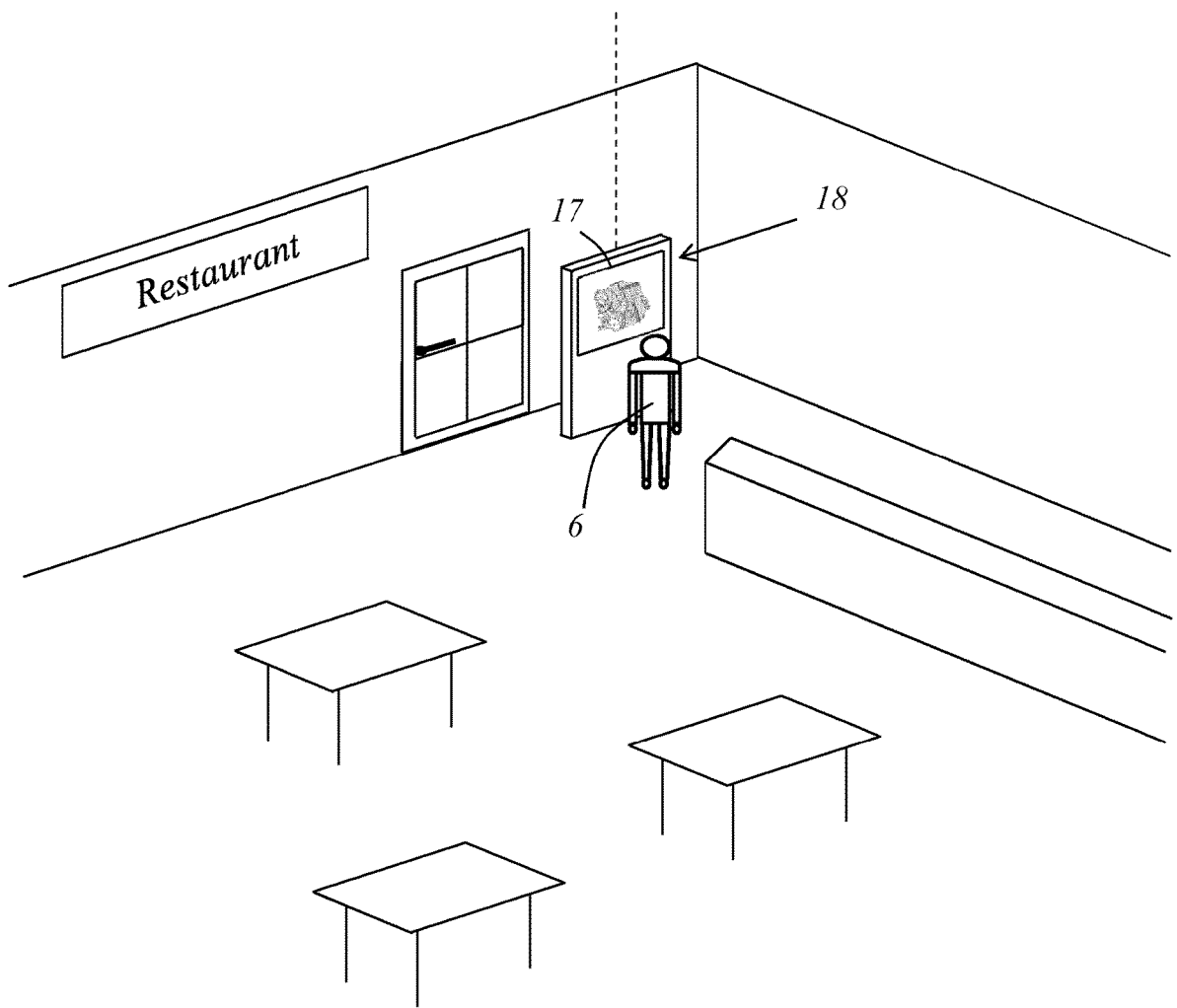
FIG. 6 depicts an exemplary embodiment of an additional detection device in the form of a kiosk system of a sales support system according to the present disclosure.

Such an additional detection device 17 in the form of a kiosk system 18 may alternatively or additionally also be installed, for example, in an airport or in a restaurant, as shown in FIGS. 5 and 6.

Figure 7:
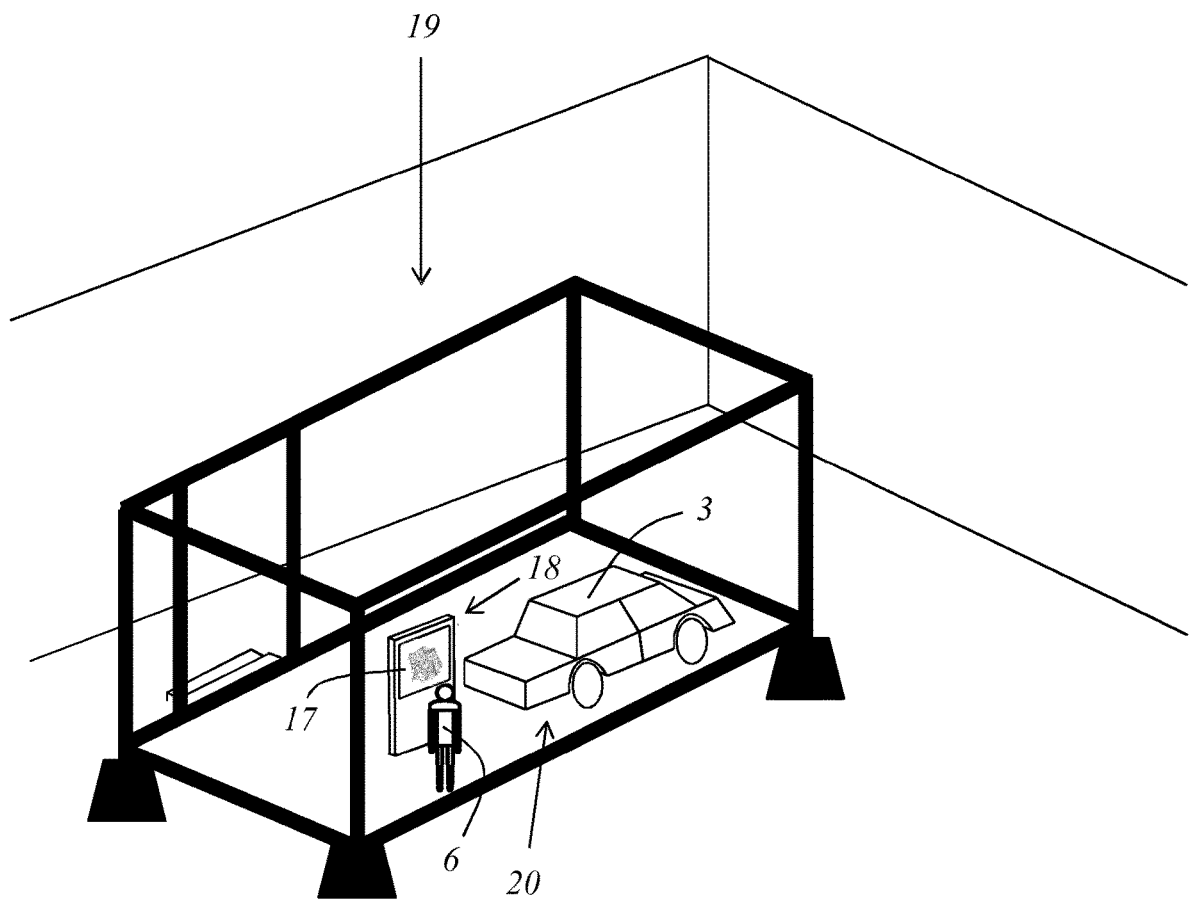
FIG. 7 depicts an exemplary embodiment of a presentation platform of a sales support system according to the present disclosure.

FIG. 7 depicts an exemplary embodiment of an additional detection device 17 of a sales support system 1 according to the present disclosure, wherein the additional detection device 17 is configured as part of a presentation platform 19. The additional detection device 17 is also connected, preferably wirelessly, to the control system 8, and passes acquired customer information to the control system 8.

The mobile presentation platform 19 may comprise a display area 20 for vehicles 3. In addition, the mobile presentation platform 19 is equipped with an additional detection device 17. By means of its additional detection device 17, the mobile presentation platform 19 acquires at least one item of customer information about a customer 6 who enters the mobile presentation platform 19 or who approaches the mobile presentation platform 19, automatically and in particular without any particular action on the part of the customer 6, and passes said information to the computer-aided control system 8. This customer information is available at a later time if the customer 6 enters the showroom 2, in order for the control system 8 to be able to determine customer-specific product information 9.

Figure 8:
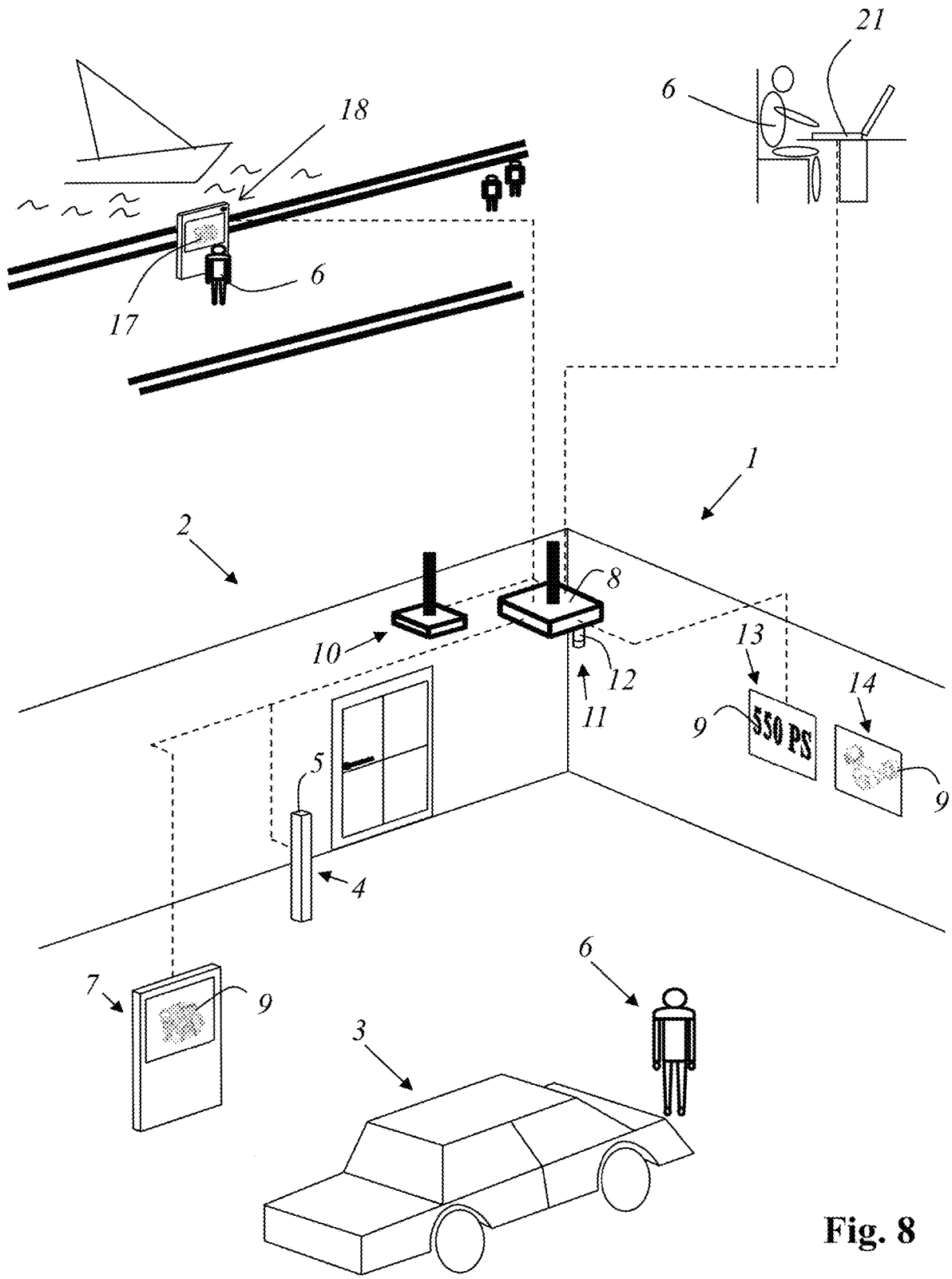
FIG. 8 depicts an exemplary embodiment of another sales support system according to the present disclosure.

FIG. 8 depicts an exemplary embodiment of another sales support system 1 according to the present disclosure, which comprises a showroom 2 equipped as in FIGS. 1 to 3.

In addition, the sales support system 1 comprises an additional detection device 17 that is configured as part of a kiosk system 18. The additional detection device 17 is connected, preferably wirelessly, to the control system 8, and passes acquired customer information to the control system 8.

In addition, the sales support system 1 comprises an additional detection device 17 that is configured as part of a presentation platform 19. This additional detection device 17 is also connected, preferably wirelessly, to the control system 8, and passes acquired customer information to the control system 8.

In addition, the control system 8 is designed and configured to receive at least one additional item of customer information from a PC 21 of the customer 6 via the Internet.

For example, the control system 8 may receive a product configuration entered by means of a configuration program provided on a website, via which in particular a vehicle 3 including equipment is configurable, and use it as customer information in order to determine customer-specific product information 9.

LIST OF REFERENCE SIGNS

1 Sales support system
2 Showroom
3 Vehicle
4 First detection device
5 Reader
6 Customer
7 First output device
8 Control system
9 Product information
10 Second detection device
11 Third detection device
12 Camera
13 Second output device
14 Third output device
15 Salesperson
16 Tablet PC
17 Additional detection device
18 Kiosk system
19 Presentation platform
20 Display area
21 PC

What is claimed is:

1. A sales support system for supporting the sale of vehicles and/or vehicle accessories, the sales support system comprising:
   a. a computer-aided control system that is designed and equipped to receive customer-related customer information, and to determine and transmit customer-specific product information therefrom, wherein the customer-specific product information is customized based on said customer-related customer information, and
   b. a showroom that includes at least one detection device arranged in a customer entry area of the showroom and at least one output device, wherein
   c. the at least one detection device acquires at least one item of customer information about a customer who enters the showroom or is in the showroom, automatically and without any action on the part of the customer and without any action on the part of another person in the showroom, and transmits said at least one item of customer information to the computer-aided control system, and wherein
   d. the computer-aided control system determines at least one item of customer-specific product information from the acquired at least one item of customer information, wherein the at least one item of customer-specific product information is customized based on said at least one item of customer information, and transmits said at least one item of customer-specific product information to the at least one output device, and wherein
   e. the at least one output device receives the at least one item of customer-specific product information from the computer-aided control system and outputs said at least one item of customer-specific product information for perception by said customer, and wherein
   f. the at least one detection device reads automatically and wirelessly the at least one item of customer information from an electronic device carried by the customer, wherein the electronic device is a car key that contains a data memory.

2. The sales support system as claimed in claim 1, wherein
   a. the at least one detection device comprises a radio receiver and/or a radio transmitter, or
   b. the at least one detection device comprises a radio receiver and/or a radio transmitter that operates on the basis of RFID or NFC or WLAN or Bluetooth.

3. The sales support system as claimed in claim 1, wherein
   a. the at least one detection device determines a location of the electronic device inside the showroom continuously or at time intervals, or
   b. the at least one detection device includes several detection devices which determine a location of the electronic device inside the showroom by means of triangulation, continuously or at time intervals, or
   c. the at least one detection device determines a location of the electronic device inside the showroom, and a time that the electronic device remains at the respective determined location continuously or at time intervals, or
   d. the at least one detection device includes several detection devices which determine a location of the electronic device inside the showroom by means of triangulation, and determine a time that the electronic device remains at the respective determined location, continuously or at time intervals.

4. The sales support system as claimed in claim 1, wherein
   a. the at least one detection device continuously detects where the customer is located in the showroom, and/or
   b. the at least one detection device detects whether the customer is moving inside the showroom, and/or
   c. the at least one detection device detects a route that the customer takes inside the showroom, and/or
   d. the at least one detection device detects an output device of the at least one output device toward which the customer is moving, and/or
   e. the at least one detection device detects an output device of the at least one output device in front of which the customer is located, and/or
   f. the at least one detection device detects the customer's current viewing direction.

5. The sales support system as claimed in claim 1, wherein the at least one detection device comprises at least one camera and/or at least one microphone.

6. The sales support system as claimed in claim 1, wherein the at least one detection device includes several detection devices.

7. The sales support system as claimed in claim 1, wherein the at least one output device includes a display screen or a touchscreen or a tablet PC configured to display content including the at least one item of customer-specific product information.

8. The sales support system as claimed in claim 7, wherein the at least one detection device detects, by tracking pupil movement of the customer's eyes, and transmits to the computer-aided control system, which sections of the content displayed on the display screen or the touchscreen or the tablet PC are being viewed by the customer.

9. The sales support system as claimed in claim 8, wherein the at least one detection device detects a facial expression of the customer and transmits it to the computer-aided control system as customer information.

10. The sales support system as claimed in claim 1, wherein the at least one output device is configured as an interactive price tag that outputs an item of price information as product information.

11. The sales support system as claimed in claim 1, further comprising at least one additional detection device that is not arranged in the showroom, and that is designed and configured to acquire at least one additional item of customer information about a customer, and to transmit the at least one additional item of customer information to the computer-aided control system.

12. The sales support system as claimed in claim 11, wherein, for determining the at least one item of customer-specific product information, the computer-aided control system also takes into consideration the at least one additional item of customer information that was acquired by the at least one additional detection device before the customer entered the showroom.

13. The sales support system as claimed in claim 11, wherein the at least one additional detection device is configured as part of an interactive kiosk system.

14. The sales support system as claimed in claim 13, wherein the at least one additional detection device of the kiosk system transmits a customer's inputs to the computer-aided control system as additional items of customer information.

15. The sales support system as claimed in claim 13, wherein the kiosk system comprises a display screen for displaying content and a pupil monitoring system, wherein the pupil monitoring system determines which sections of the content displayed on the display screen are being viewed by the customer by tracking pupil movement of the customer's eyes, as an additional item of customer information.

16. The sales support system as claimed in claim 13, wherein the at least one additional detection device of the kiosk system comprises a microphone and/or a camera.

17. The sales support system as claimed in claim 13, wherein the at least one detection device of the kiosk system detects an externally detectable state of mind of the customer by detecting a facial expression of the customer or sounds emitted by the customer, and transmits the detected state of mind of the customer to the computer-aided control system as an additional item of customer information.

18. The sales support system as claimed in claim 12, wherein the at least one additional detection device is part of a mobile presentation platform that provides a display area for at least one product.

19. The sales support system as claimed in claim 1, wherein the computer-aided control system is designed and configured to receive at least one additional item of customer information via the Internet, and for determining the at least one item of customer-specific product information, the computer-aided control system also takes into consideration the additional item of customer information received via the Internet.

20. The sales support system as claimed in claim 11, wherein
a. the at least one item of customer information and/or the at least one item of additional customer information relate to a VIN (vehicle identification number) of the customer's vehicle, and/or
b. the at least one item of customer information and/or the at least one item of additional customer information relate to the customer's gender, and/or
c. the at least one item of customer information and/or the at least one item of additional customer information relate to facial features of the customer, and/or
d. the at least one item of customer information and/or the at least one item of additional customer information relate to a gait pattern of the customer, and/or
e. the at least one item of customer information and/or the at least one item of additional customer information relate to the customer's name and/or address, and/or
f. the at least one item of customer information and/or the at least one item of additional customer information relate to a vehicle type and/or a vehicle age and/or a vehicle equipment and/or a driving behavior and/or a vehicle condition of the customer's vehicle, and/or
g. the at least one item of customer information and/or the at least one item of additional customer information include which sections of a content displayed on a display screen have been viewed by the customer, and/or
h. the at least one item of customer information and/or the at least one item of additional customer information relate to an item of information about a CPU and/or a graphics card and/or a monitor and/or a GPS receiver and/or an IP address and/or a location and/or a MAC address and/or an operating system and/or a browser type and/or a time zone and/or installed fonts and/or cookies of a smartphone of the customer, and/or
i. the at least one item of customer information and/or the at least one item of additional customer information relate to an item of information about a CPU and/or a graphics card and/or a monitor and/or a GPS receiver and/or an IP address and/or a location and/or a MAC address and/or an operating system and/or a browser type and/or a time zone and/or installed fonts and/or cookies of the customer's PC.

21. The sales support system as claimed in claim 1, wherein an association of possible customer information or possible combinations of customer information on the one hand, with product information on the other hand, is stored in a memory area of the computer-aided control system.

22. A sales support method for supporting the sale of vehicles and/or vehicle accessories, the sales support method comprising:
providing a vehicle showroom;
arranging a detection device in a customer entry area of the showroom;
operating the detection device to automatically and wirelessly read at least one item of customer information from an electronic device carried by a customer as the customer enters the showroom to acquire the at least one item of customer information without any action by the customer and without any action by another person in the showroom, wherein the electronic device is a car key that contains a data memory;
transmitting the at least one item of customer information to a computer-aided control system;
determining, by the computer-aided control system, at least one item of customer-specific product information customized based on said at least one item of customer information;
transmitting, by the computer-aided control system, the at least one item of customer-specific product information to an output device positioned at a fixed location in the vehicle showroom; and
outputting, by the output device, the at least one item of customer-specific product information for perception of the at least one item of customer-specific product information by the customer.

* * * * *